United States Patent [19]

Turner et al.

[11] Patent Number: 4,852,761
[45] Date of Patent: Aug. 1, 1989

[54] IN TANK VAPOR STORAGE CANISTER

[75] Inventors: Kenneth W. Turner, Webster; Charles H. Covert, Manchester; Karen M. Meyer, Webster, all of N.Y.

[73] Assignee: General Motors Corporation, Detroit, Mich.

[21] Appl. No.: 223,495

[22] Filed: Jul. 25, 1988

[51] Int. Cl.[4] ............................................. F02M 33/02
[52] U.S. Cl. ............................. 220/85 VR; 123/519; 137/43; 137/588
[58] Field of Search ...................... 220/85 VR, 85 VS; 123/519, 520, 521; 137/587, 588, 43

[56] References Cited

U.S. PATENT DOCUMENTS 1,841,691  1/1932  Wilson .
3,372,679  3/1968  Aitken ............................. 123/136
3,693,825  9/1972  Richman ........................ 220/26 R
3,804,291  4/1974  Fricker ........................... 220/85 R
3,831,353  8/1974  Toth ............................... 123/519 X
3,884,204  5/1975  Krautwurst et al. ............ 123/519
3,910,302  10/1975  Sudhir ........................ 220/85 VS X
3,917,109  11/1975  MacDonald .................. 220/85 VS
4,683,862  8/1987  Fornuto et al. ................. 123/520

Primary Examiner—Stephen Hepperle
Attorney, Agent, or Firm—Patrick M. Griffin

[57] ABSTRACT

A specially designed vapor storage canister may be placed within the interior volume of a fuel tank, eliminating the need for a tank to canister vapor line and shortening the TVVA to canister vapor line, while still protecting the adsorbent bed against contamination by liquid fuel.

3 Claims, 2 Drawing Sheets

IN TANK VAPOR STORAGE CANISTER

This invention relates to vehicle evaporative emissions control systems in general, and specifically to an improved vapor storage canister for such a system that is adapted to work internally to the tank.

BACKGROUND OF THE INVENTION

Automotive vehicles have for some years now incorporated mandated evaporative fuel emissions control systems. Such systems typically include a canister with a charge of fuel vapor adsorbent material which is mounted to the vehicle body, most often under the hood. A tank line runs from the tank to the canister to store vapors produced in the tank as it sits, generally called the diurnal loss. A purge line runs from the canister to the engine manifold for stored vapor disposal. The tank line may be quite lengthy, especially if the canister is mounted under the hood. New standards have been proposed to also require the control and storage of fuel vapors displaced from the tank as it is filled, which have just been sent to atmosphere in the past. Vehicle systems upgraded to handle fuel fill losses have become known as on-board systems to distinguish them from other systems proposed to handle the fuel fill losses at the filling station instead. Most proposed on board systems block the exit of fuel fill vapors at the filler neck with a control valve, generally referred to as a TVVA, and route the blocked vapors to the same canister, with another vapor line. The vapor line from the TVVA to the canister will be as long or longer than the tank to canister line. A more serious design constraint with on board systems is that canister capacity and size may have to be greatly increased, because of the large volume of displaced fuel fill vapors, leading to under hood packaging difficulties.

SUMMARY OF THE INVENTION

The invention provides an on board evaporative emissions control system that avoids the twin drawbacks of lengthy vapor lines and packaging constraints. The invention is incorporated in a vehicle with a fuel tank that has a vapor space defined between its top wall and the normal maximum fuel fill level. The canister is mounted entirely within the fuel tank by securing its upper wall to the tank top wall. The canister may be long enough to extend into the liquid fuel, but at least the upper part of its outer wall will be located in the vapor space, above the normal fuel fill level. So, while the canister may reduce fuel capacity somewhat, there will be fewer constraints on its size and shape. A trap chamber is located inside the canister, just below its upper wall. The trap chamber has a catch basin, and a purge tube and TVVA fitting open through the upper wall and into the catch basin. A vapor distribution port in the form of a tube inside the trap chamber opens from a high point within the catch basin to a bed of adsorbent material in the canister. While the purge line from the canister to the engine will be lengthened compared to under hood mounted canisters, the vapor line from the TVVA to the canister is shortened considerably, and the vapor line from the tank vapor space to the canister is eliminated completely.

In place of the tank line, vapor inlet tubes within the canister open at their lower end through the upper portion of the canister wall and slope upwardly into the trap chamber at their upper ends. The inlet tubes are closed except for the openings at each end, so neither liquid nor vapor can reach the adsorbent directly through the inlet tubes. Condensing vapor is trapped in the trap chamber catch basin, and non condensing vapor enters the adsorbent bed through the distribution tube. Any liquid fuel entering the inlet tubes at the lower ends will tend to run out before reaching the trap chamber. In addition, in the embodiment disclosed, a valve chamber interposed between the upper end of the fuel inlet tubes and the trap chamber serves as an additional barrier to liquid fuel entry to the chamber, and contains a gravity valve to protect the adsorbent bed in the event of canister inversion.

It is, therefore, an object of the invention to provide an automotive evaporative emissions control system that reduces total vapor line length and which has fewer constraints on canister packaging and size.

It is another object of the invention to provide a canister for such a system that is mounted entirely within the fuel tank, so that it may be any shape or size that the tank volume permits, with at least the upper portion of the canister located within the tank vapor space so that upwardly sloping inlet vapor tubes feeding into a canister trap chamber may be used to eliminate the tank vapor line completely, while still protecting the adsorbent of the tank.

It is another object of the invention to provide such a canister in which a gravity valve chamber interposed between the upper end of the vapor inlet tubes and the trap chamber provides additional protection against the contamination of the adsorbent by liquid fuel.

DESCRIPTION OF THE PREFERRED EMBODIMENT

These and other objects and features of the invention will appear from the following written description, and from the drawings, in which.

Figure 1:
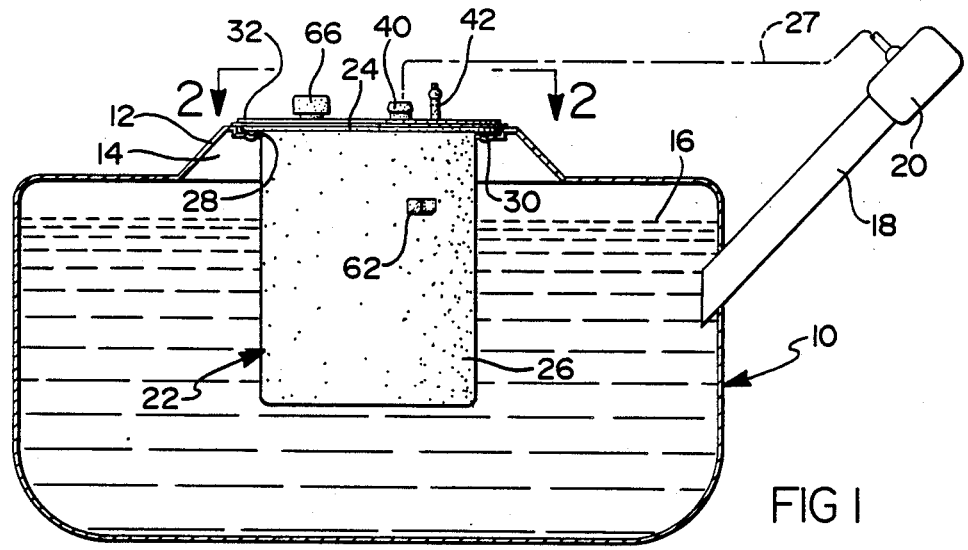
FIG. 1 is a partially schematic view of a preferred embodiment of the automotive evaporative emissions control system of the invention showing the tank in section and the canister in elevation.

Referring first to FIG. 1, an automotive fuel tank, designated generally at 10, has a generally dome shaped top wall 12 that forms a vapor space 14 above the normal maximum fuel fill level, denoted at 16. Tank 10 also has a filler neck 18 with a TVVA 20 of the general type described above incorporated at the upper end. In a conventional design, vapor lines would run from both tank top wall 12 and TVVA 20 to a storage canister mounted remotely, most likely under hood. Here, a specially designed canister, denoted generally at 22, is instead mounted entirely within tank 10. Canister 22 is manufactured of a suitably fuel resistant material in a generally cylindrical shape with a circular upper wall 24 and cylindrical outer wall 26. Canister upper wall 24 is secured to and within tank 10 in a fashion described in more detail below. The in tank location of canister 22 would lengthen the canister to engine vapor purge line, not illustrated, but would considerably shorten the vapor line 27 from the TVVA 20 to canister 22, and the usual vapor line from tank 12 to canister 22 is eliminated altogether, as will appear.

Figure 3:
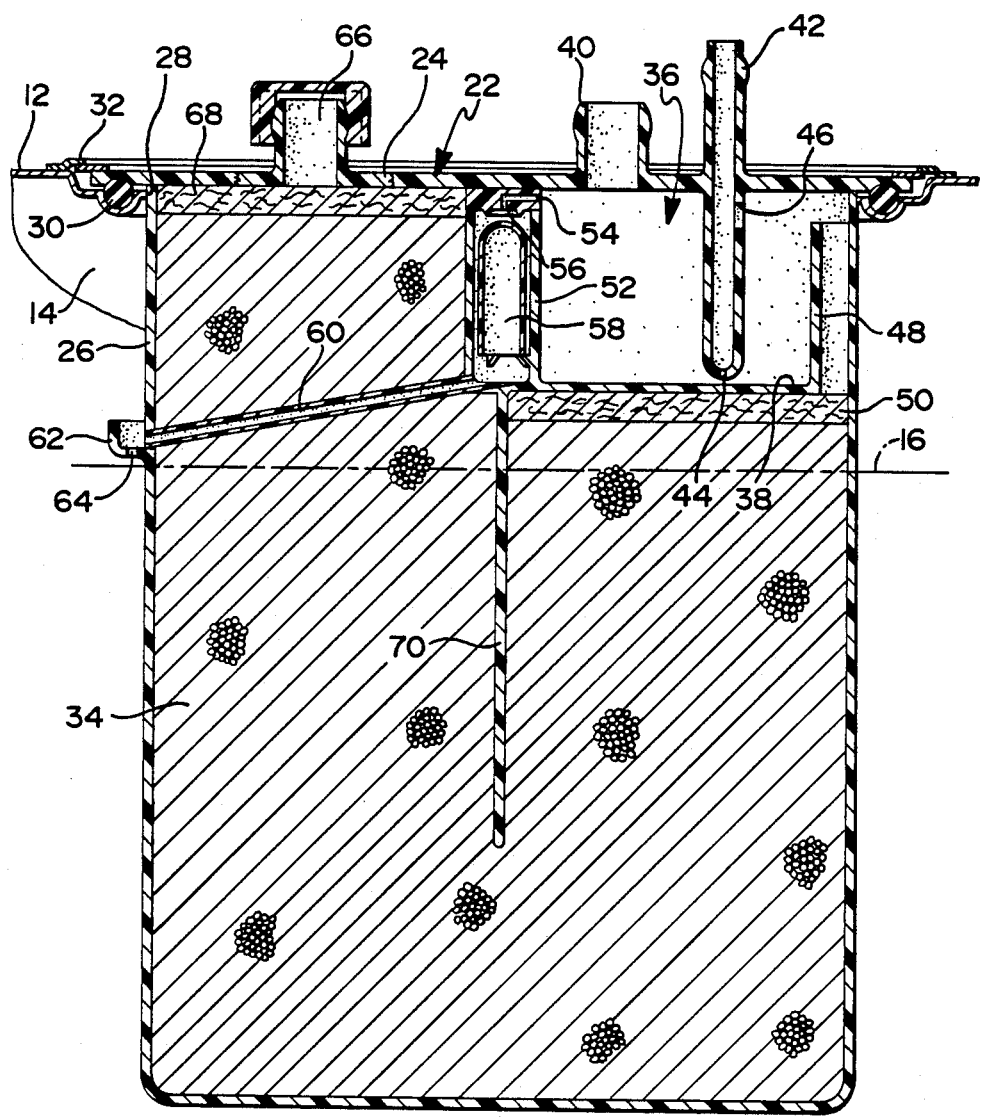
FIG. 3 is a cross sectional view of the canister taken along the line 3—3 of FIG. 2.

Referring next to FIG. 3, fuel tank top wall 12 has a round hole 28 cut therethrough into which canister 22 can be lowered until the edge of canister upper wall 24 rests on the edge of hole 28, against a seal 30. Upper wall 24 is then fixed in place with a rim 32 so that tank 10 and canister 22 form a unit. The entire cylindrical outer wall 26 of canister 22 is thereby located internal to tank 10, with at least the upper portion thereof being located above the fuel fill maximum level 16, within vapor space 14. As disclosed, canister 22 is also long enough that the lower portion of outer wall 26 extends below the normal fuel fill level 16, but this does not present a problem as it is closed bottomed and molded of fuel resistant material. Canister 22 contains the usual charge of adsorbent material 34, generally activated charcoal granules. While the extension of canister 22 into the liquid fuel will limit total fuel capacity to a certain degree, canister 22 may accordingly be made to be almost any desired size and shape, within the internal limits of tank 10, allowing the volume of adsorbent 34 to be greater. The fuel vapor that loads adsorbent 34 does not reach it directly, however, so that contamination by liquid fuel is avoided.

Figure 2:
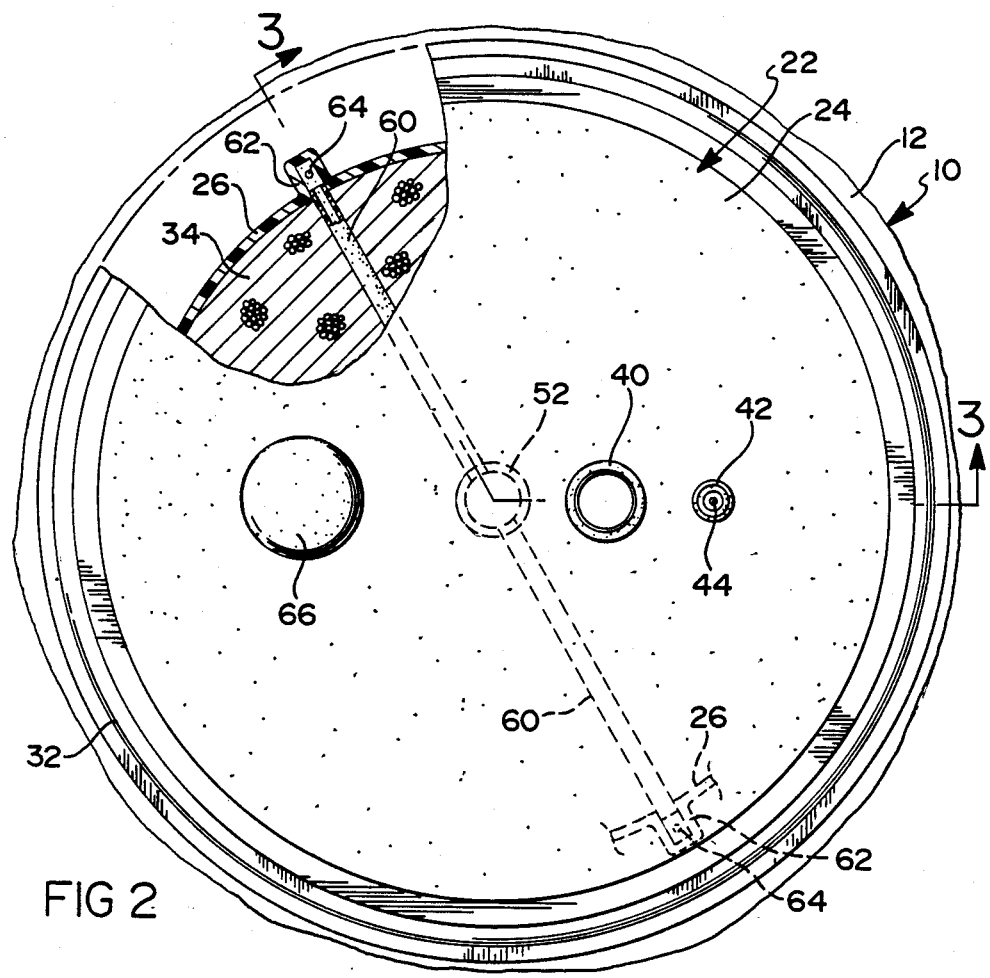
FIG. 2 is a view taken along the line 2—2 of FIG. 1, showing part of the top wall of the canister broken away.

Referring next to FIGS. 2 and 3, details of canister 22 that allow the elimination of the conventional tank to canister vapor line may be seen. A trap chamber indicated generally at 36 is located inside canister 22, just below upper wall 24, covering approximately 180 degrees. The bottom and side walls of trap chamber 36 form a catch basin 38 below upper wall 24 that contains no adsorbent 34. A fitting 40 for TVVA vapor line 27 and a purge tube 42 both open through upper wall 24. Purge tube 42 runs near to the bottom of catch basin 38, with a smaller, lower opening 44 at the bottom and a larger, upper opening 46 in the side. Trap chamber 36 is sealed from adsorbent 34 but for a vapor distribution port, which is a tube 48 near the canister outer wall 26. The upper end of distribution tube 48 is located high within trap chamber 36, about level with purge tube upper opening 46 and the lower end opens to adsorbent 34 across a first filter screen 50. A central, cylindrical valve housing 52 is also located internal to canister 22, adjacent to trap chamber 36. Valve housing 52 is also sealed from adsorbent 34, but for a restricted passage 54 of approximately 0.055" diameter opens through a valve seat 56 at the top wall of valve housing 52 and into trap chamber 36. A gravity acting valve 58 of smaller diameter than housing 52 is supported above its lower wall, ready to engage seat 56 and close off passage 54 should canister 22 become inverted. Both trap chamber 36 and valve housing 52 are high enough within canister 22 to also be located high within the vapor space 14. Therefore, a series of upwardly sloping vapor inlet tubes 60 may open at their lower ends through the part of canister outer wall 26 that is within vapor space 14 and slope upwardly from there to open at their upper ends through the lower wall of valve housing 52. There are two tubes 60 as shown, about 180 degrees apart, although there could be more, or only one. Tubes 60 are closed but for their lower ends, which are covered by trough like splash guards 62 with drain holes 64 at the bottom, and their upper ends, which do not open directly to adsorbent 34. A fresh air opening 66 opens through the canister upper wall 24 to adsorbent 34 across a second filter screen 68. Finally, a baffle plate 70 runs down about two thirds through the center of the bed of adsorbent 34.

Referring next to FIG. 3, the structure described above eliminates the need for the conventional tank to canister vent line, yet still protects the adsorbent bed 34 against direct liquid fuel contamination, despite the fact that canister 22 is located within tank 10. The lower ends of vapor inlet tubes 60 represent the only path into canister 22 for fuel in either liquid or vapor form. The splash guards 62 are a first line of defense against liquid entry, and that which does enter, or which condenses in tube 60, will run back down and out through drain holes 64. Vapor rising far enough to enter valve housing 52 will, if it does not condense and run out, find its way through restricted passage 54 into trap chamber 36. Any fuel vapor that condenses at that point will fill catch basin 38, and any that does not condense may finally reach adsorbent 34 in vapor form, through distribution tube 48, where it will be stored. So, valve housing 52 makes the vapor path to trap chamber 36 more tortuous, creating more chances for vapor to condense and run out in liquid form. Vapor from TVVA 20 reaches the trap chamber 36 directly through line 27 and fitting 40. Any condensing vapor from line 27 will also fill catch basin 38, and is protected from direct entry to adsorbent 34 by the fact that fitting 40 and tube 48 are offset from one another within trap chamber 36. Of course, air may enter adsorbent 34 along with the fuel vapors, which may exit through fresh air opening 66. When suction is applied to purge tube 42 through a purge line, not illustrated, any condensed liquid fuel is drawn from catch basin 38 through lower opening 44 and suction is applied to tube 48 through purge tube upper opening 46. Fresh air is thereby drawn through opening 66, down through screen 68, through bed 34, and around baffle plate 70 to thoroughly desorb stored vapors. The restricted passage 54 allows very little vapor to be drawn directly from vapor space 14 through tubes 60. Should canister 22 be inverted, valve 58 engages seat 56 to protect against direct liquid entry to trap chamber 36.

Variations of the preferred embodiment disclosed may be made. Vapor inlet tubes 60 could open directly into trap chamber 36, across a suitable restriction, without passing through valve housing 52. The interposition of valve housing 52 provides not only inversion protection, however, but the additional protection against the entry of condensate to trap chamber 36, as noted above. Also, being at the upper center of the interior of canister 22, valve housing 52 also cooperates to provide a useful central manifold or distribution means, with all inlet tubes 60 opening through its lower wall, with the single restricted passage 54 and valve seat 56 at the top. Vapor inlet tubes 60 could be more or less in number, as noted. Trap chamber 36 could be of a number of different designs, so long as the upwardly sloping vapor inlet tubes 60 opened into it, directly or indirectly, as shown. Therefore, it will be understood that the invention is not intended to be limited to just the preferred embodiment disclosed.

The embodiments of the invention in which an exclusive property or privilege is claimed are defined as follows:

1. An evaporative emissions control system for an automotive vehicle, comprising, a fuel tank having a vapor space defined between the top of said tank and the normal fuel fill level of said tank, a fuel adsorbent containing canister located within said tank so that at least the upper portion of an outer wall of said canister is located above said normal fuel fill level and within said tank vapor space, a trap chamber internal to said canister having a catch basin into which a purge tube opens and a vapor distribution port located above said catch basin and opening to said adsorbent, at least one vapor inlet tube opening through the upper portion of said canister outer wall and sloping upwardly through said canister into said trap chamber, whereby, fuel vapors in said tank vapor space may rise through said inlet tube and into said trap chamber where condensing vapor will be collected in said catch basin to be purged later and non-condensing vapor will be distributed to said adsorbent, while liquid fuel entering said upwardly sloping inlet tube will run back out so as to protect said adsorbent.

2. An emissions control system for an automotive vehicle, comprising, a fuel tank having a vapor space defined between the top of said tank and the normal fuel fill level of said tank, a fuel adsorbent containing canister located within said tank and having an upper wall and an outer wall, with the upper wall secured to the top of said fuel tank so that at least the upper portion of said canister outer wall is located above said normal fuel fill level and within said tank vapor space, said canister further comprising a valve chamber internal to said canister that is located within said vapor space and which has an upper seat with a passage therethrough, a gravity acting valve located within said valve chamber and engageable with said seat to close said passage if said canister is inverted, a trap chamber internal to said canister and generally adjacent to said valve chamber into which said passage opens, said trap chamber having a catch basin into which a purge tube opens and a vapor distribution port located above said catch basin and opening to said adsorbent, at least one vapor inlet tube opening through the upper portion of said canister outer wall and sloping upwardly through said canister into said valve chamber, whereby, fuel vapors in said tank vapor space may rise through said inlet tube into said valve chamber and then past said gravity valve and through said passage into said trap chamber where condensing vapor will be collected in said catch basin to be purged later and non-condensing vapor will be distributed to said adsorbent, while liquid fuel entering said upwardly sloping inlet tube will run back out so as to protect said adsorbent.

3. In an automotive vehicle having a fuel tank with a vapor space defined between the top of said tank and the normal fuel fill level of said tank, an improved fuel adsorbent containing canister, comprising, an upper wall adapted to be secured to the top of said tank so that said canister will be located within said tank with at least the upper portion of said canister located above said normal fuel fill level and within said tank vapor space, a trap chamber internal to said canister having a catch basin into which a purge tube opens and a vapor distribution port located above said catch basin and opening to said adsorbent, at least one vapor inlet tube opening through the upper portion of said canister outer wall and sloping upwardly through said canister into said trap chamber, whereby, fuel vapors in said tank vapor space may rise through said inlet tube into said trap chamber where condensing vapor will be collected in said catch basin to be purged later and non-condensing vapor will be distributed to said adsorbent, while liquid fuel entering said upwardly sloping inlet tube will run back out so as to protect said adsorbent.

* * * * *